INVENTORS
GERALD C. MAYER
ARTHUR J. BURKE
ATTORNEYS
Norris & Bateman

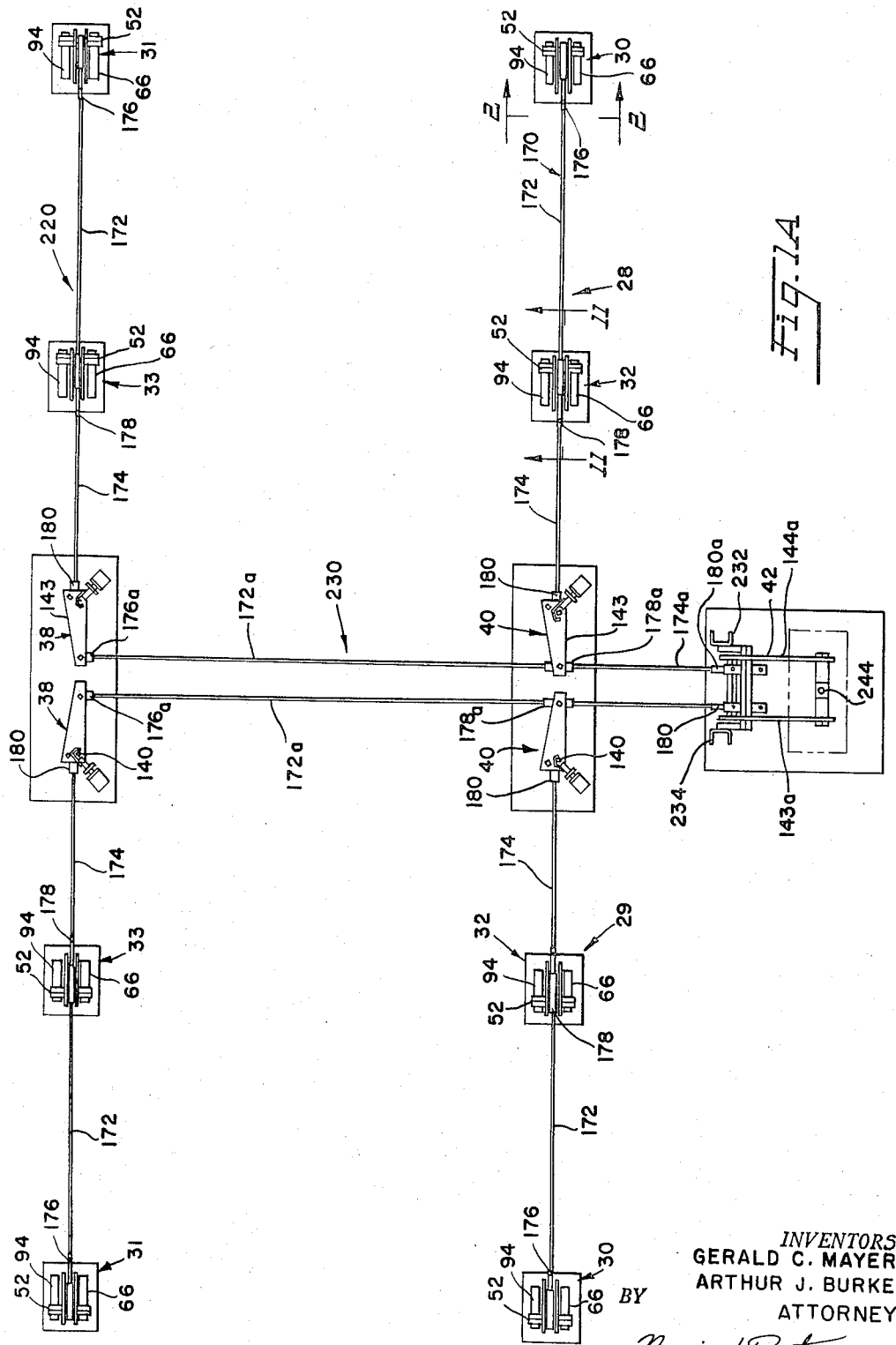

INVENTORS
GERALD C. MAYER
ARTHUR J. BURKE

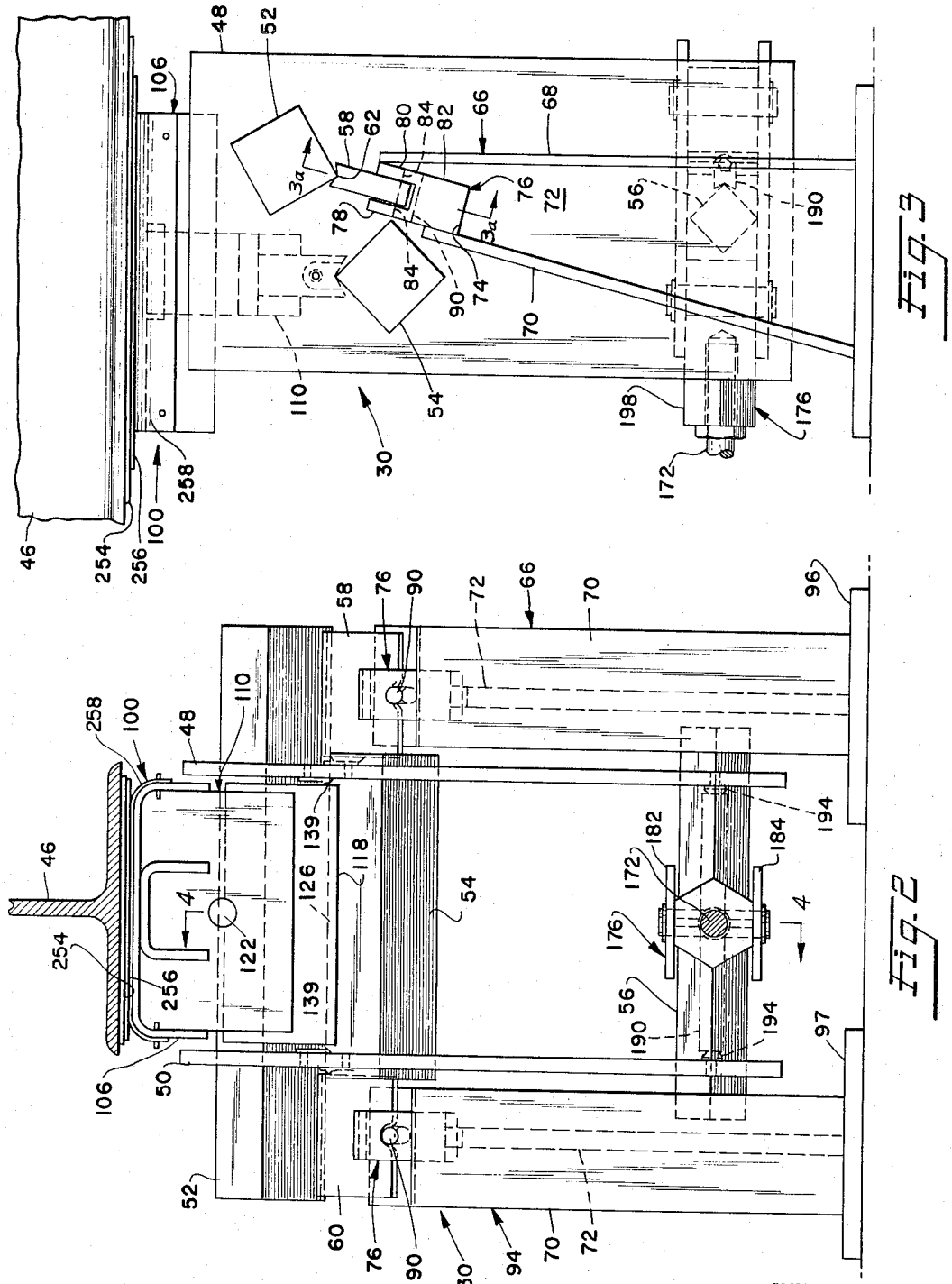

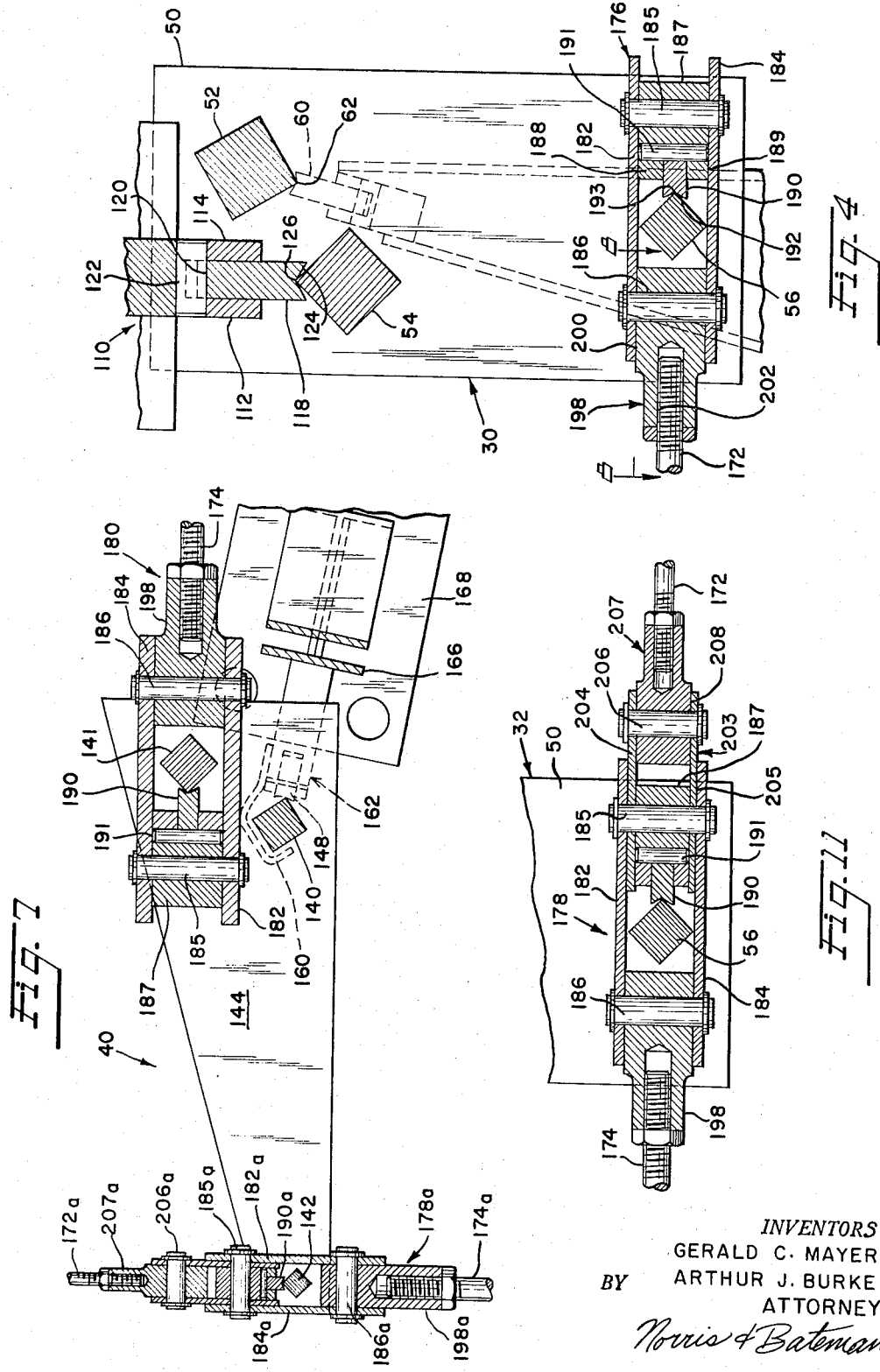

Dec. 19, 1967  G. C. MAYER ETAL  3,358,785
VEHICLE PLATFORM SCALES
Filed Sept. 16, 1966  8 Sheets-Sheet 6
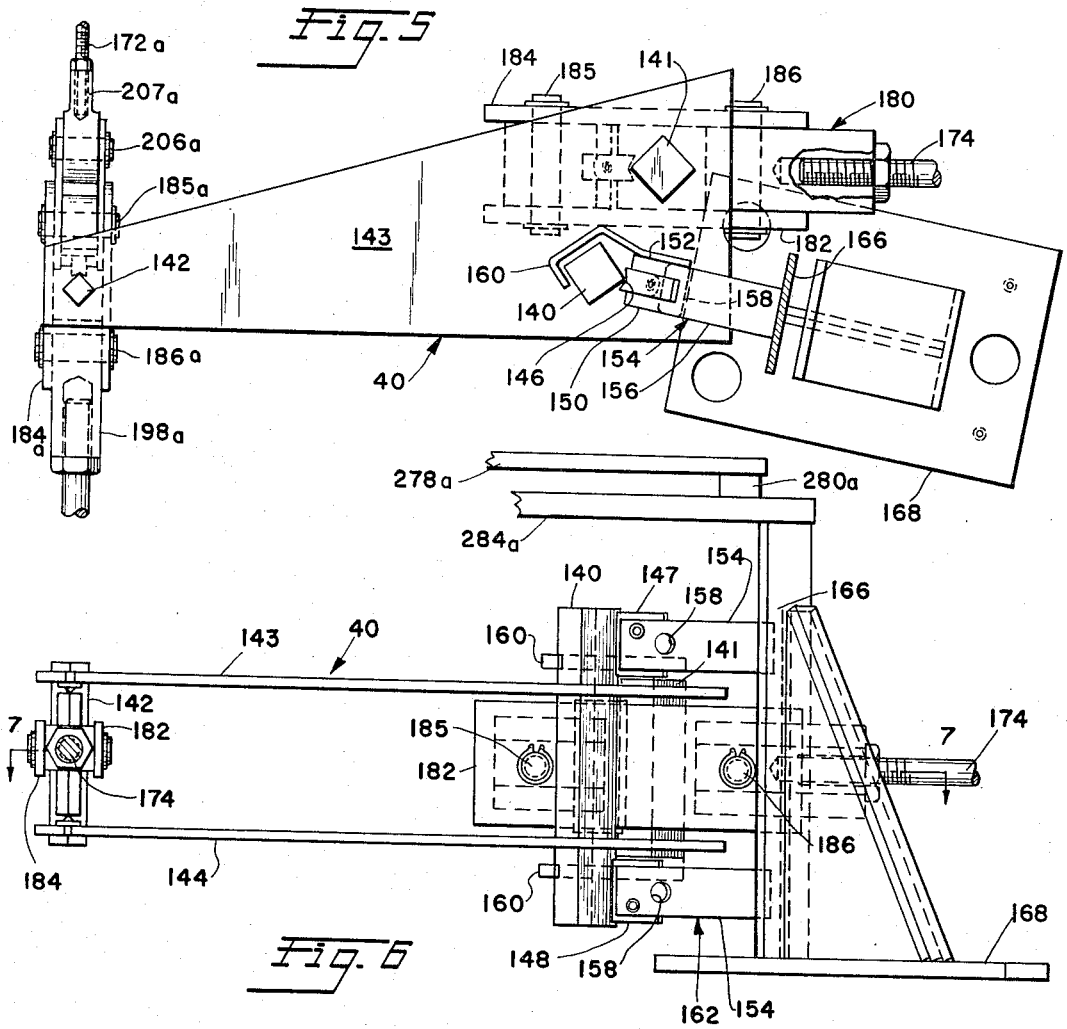
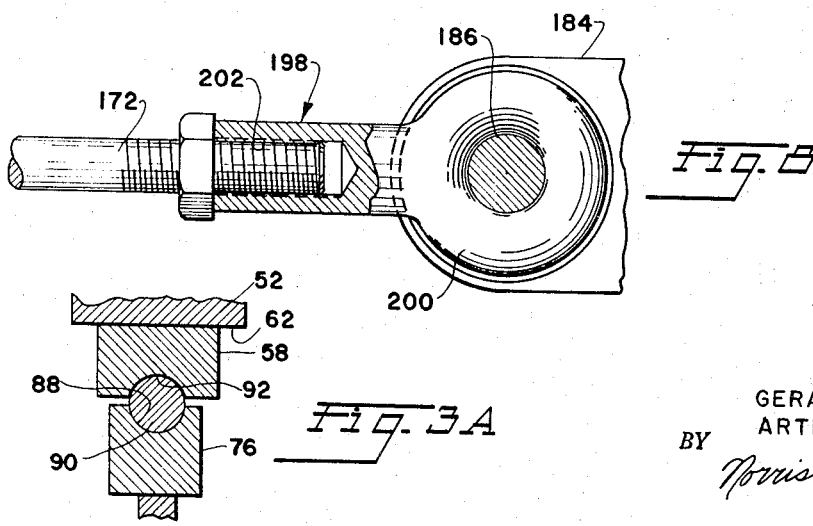
INVENTORS
GERALD C. MAYER
ARTHUR J. BURKE
BY Norris & Bateman
ATTORNEYS

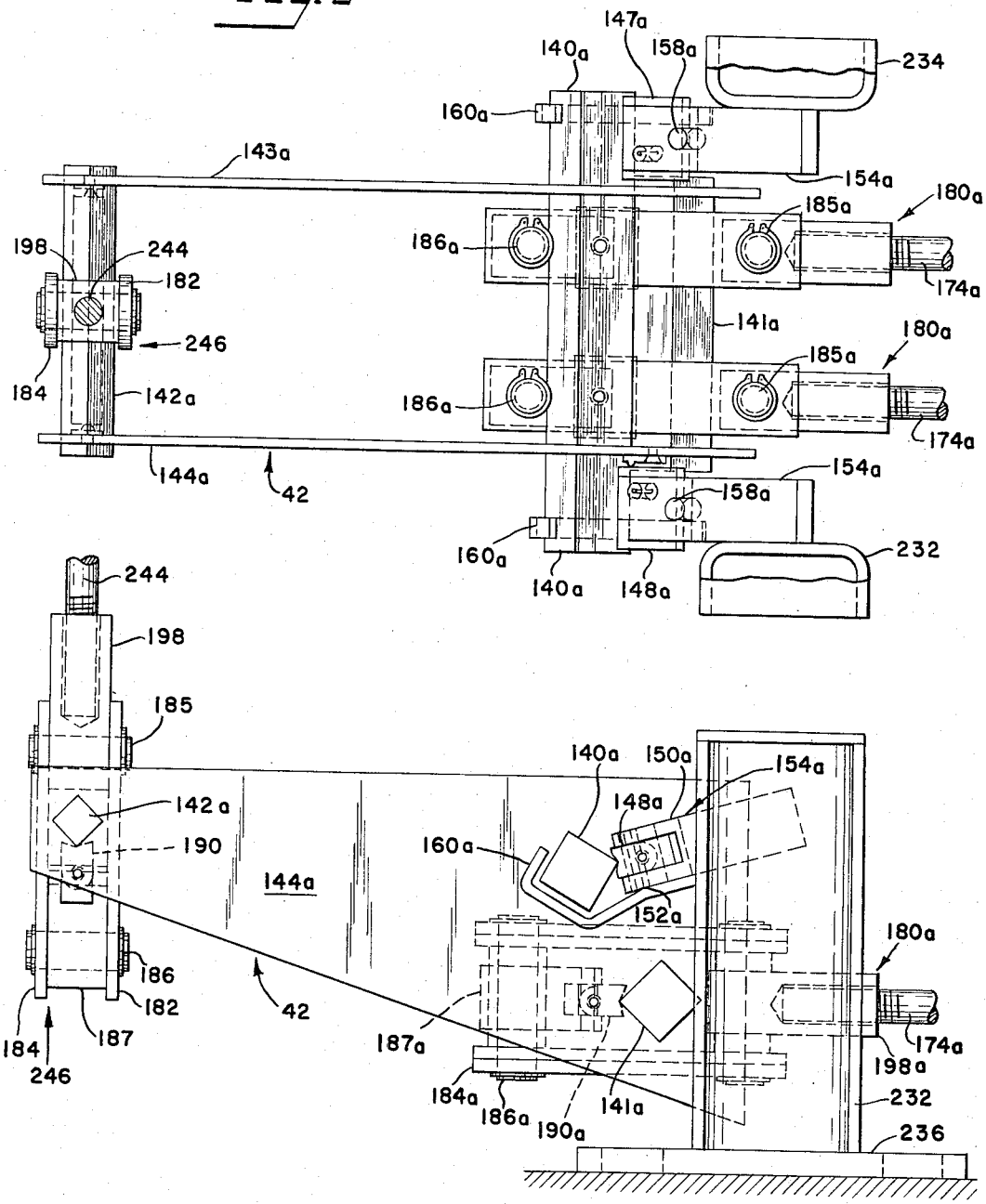

Dec. 19, 1967  G. C. MAYER ETAL  3,358,785
VEHICLE PLATFORM SCALES
Filed Sept. 16, 1966  8 Sheets-Sheet 8
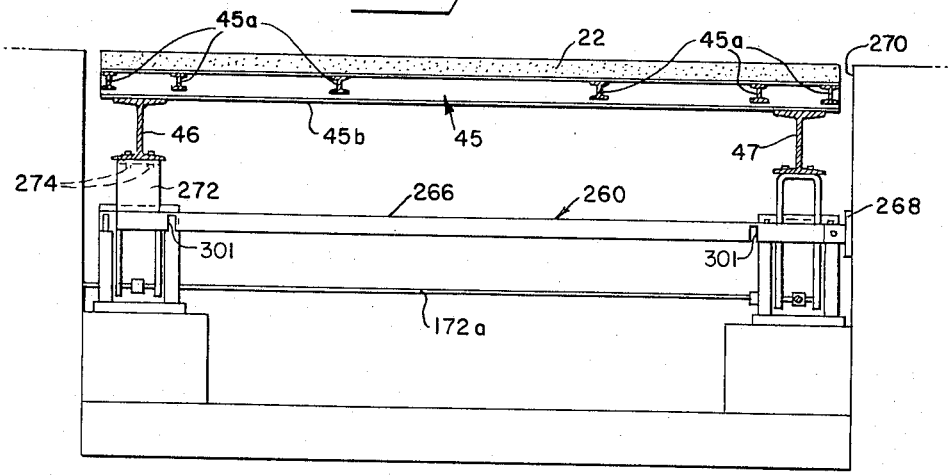
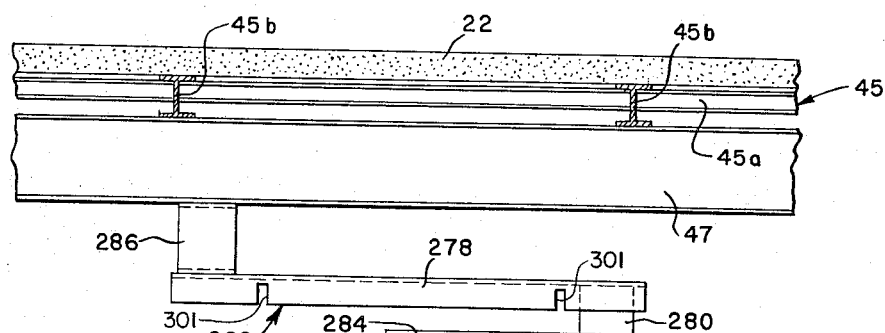
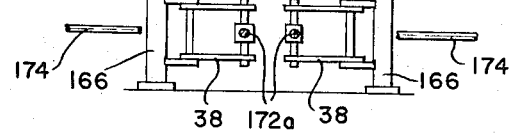
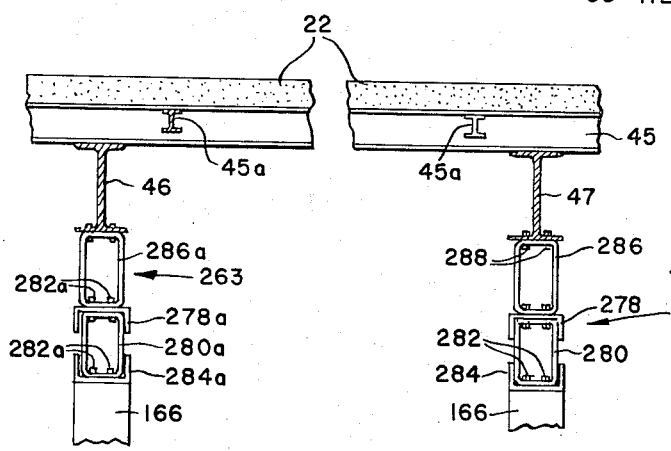
INVENTORS
GERALD C. MAYER
ARTHUR J. BURKE
BY
Norris & Bateman
ATTORNEYS

United States Patent Office 3,358,785
Patented Dec. 19, 1967

3,358,785
VEHICLE PLATFORM SCALES
Gerald C. Mayer, Wayne, and Arthur J. Burke, Oakland, N.J., assignors to Howe Richardson Scale Co., Clifton, N.J., a corporation of Delaware
Filed Sept. 16, 1966, Ser. No. 579,975
14 Claims. (Cl. 177—256)

ABSTRACT OF THE DISCLOSURE

The vehicle platform scale lever system disclosed herein comprises a single knee-joint summing lever which connects a plurality of knee-joint platform-support levers to a weight indicator. Cantilever-supported check members are connected at their free ends to the vehicle platform for absorbing longitudinal and lateral thrusts applied by vehicle movement over the platform.

---

The invention relates to weighing apparatus and is particularly concerned with direction converting and force accumulating lever arrangements which are especially suitable for vehicle platform scales.

In its preferred embodiment the invention will be described as incorporated in a motor vehicle or axle load platform scale. It will be appreciated, however, that the principles of this invention may be applied to other forms of scales such as, for example, warehouse platform scales and hopper scales.

Platform scales, which are used for weighing heavy trucks and the like, customarily are provided with levers of unusually rugged and massive construction to withstand impacts incident to vehicle movement across the platform and to provide accurate weight indications when a large percentage of the capacity load is concentrated on two vehicle wheels. Owing to their large size and heavy weight, such massive and rugged lever constructions are difficult to assemble at the weighing site and require extreme care and arduous adjustment during installation to avoid impairment of the accuracy of the scale. In addition, the size and weight of such levers require relatively complicated direction conversion and force accumulating arrangements as well as presenting bearing and support problems.

The present invention provides for a novel lever system wherein a unique arrangement and construction of main load levers, direction conversion levers, and force accumulating levers avoids the disadvantages and difficulties mentioned above. This is accomplished in brief by providing a system wherein all of the main load, direction conversion, and force accumulating levers are specially constructed knee-joint levers having transverse load and power arms and being interconnected by relatively light weight motion transmitting rods or the like. The lever system of this invention is thus relatively simple in construction, lightweight, inexpensive to manufacture, easy to assemble and install at a weighing site, and capable of providing highly accurate weight measurements without the considerable adjustment, modification, and care required with conventional systems. The lever system of this invention furthermore is so constructed that it is capable of installation in a variety of arrangements and can be incorporated into other forms of weighing apparatus such as hopper scales and the like.

Prior systems incorporating knee-joint levers have been found to be unsatisfactory for heavy-duty scales for various reasons, such as, for instance, the construction and arrangement of the levers.

It therefore is a major object of this invention to provide a novel arrangement and construction of knee-joint levers which avoids the above-mentioned difficulties and disadvantages encountered with conventional systems.

A more specific object of this invention is to provide a scale with a novel lever system wherein all of the main levers, direction changing levers, and force accumulating levers are of unique, knee-joint construction and are supported by special frame structures.

Another object of this invention is to provide a platform scale with a novel lever system which is easy to assemble, light in weight, inexpensive to manufacture, and relatively simple in construction.

Still another object of this invention is to provide a novel platform scale lever system which may be used in other forms of scales without any significant modification.

Another object of this invention is to provide a novel check rod arrangement for absorbing longitudinal and lateral thrusts applied by vehicle movement to the platform of a vehicle or axle scale.

Further objects of this invention will appear as the description proceeds in connection with the appended claims and annexed drawings wherein:

FIGURE 1a is a plan view of the scale shown in FIGURE 1 with the platform removed;

FIGURE 2 is a section taken substantially along lines 2—2 of FIGURE 1a and illustrating one of the main platform support levers in elevation;

FIGURE 3 is a side elevation of the platform support lever shown in FIGURE 2;

FIGURE 3a is a section taken substantially along lines 3a—3a of FIGURE 3;

FIGURE 4 is a section taken substantially along lines 4—4 of FIGURE 2;

FIGURE 5 is an enlarged fragmentary plan view of one of the turning levers shown in FIGURE 1a;

FIGURE 6 is a side elevation of the turning lever shown in FIGURE 5;

FIGURE 7 is a section taken substantially along lines 7—7 of FIGURE 6;

FIGURE 8 is a section taken substantially along lines 8—8 of FIGURE 4;

FIGURE 9 is an enlarged plan view of the force accumulating lever shown in FIGURE 1a;

FIGURE 10 is a side elevation of the force accumulating lever shown in FIGURE 9;

FIGURE 11 is a section taken substantially along lines 11—11 of FIGURE 1a; and

Figure 1:
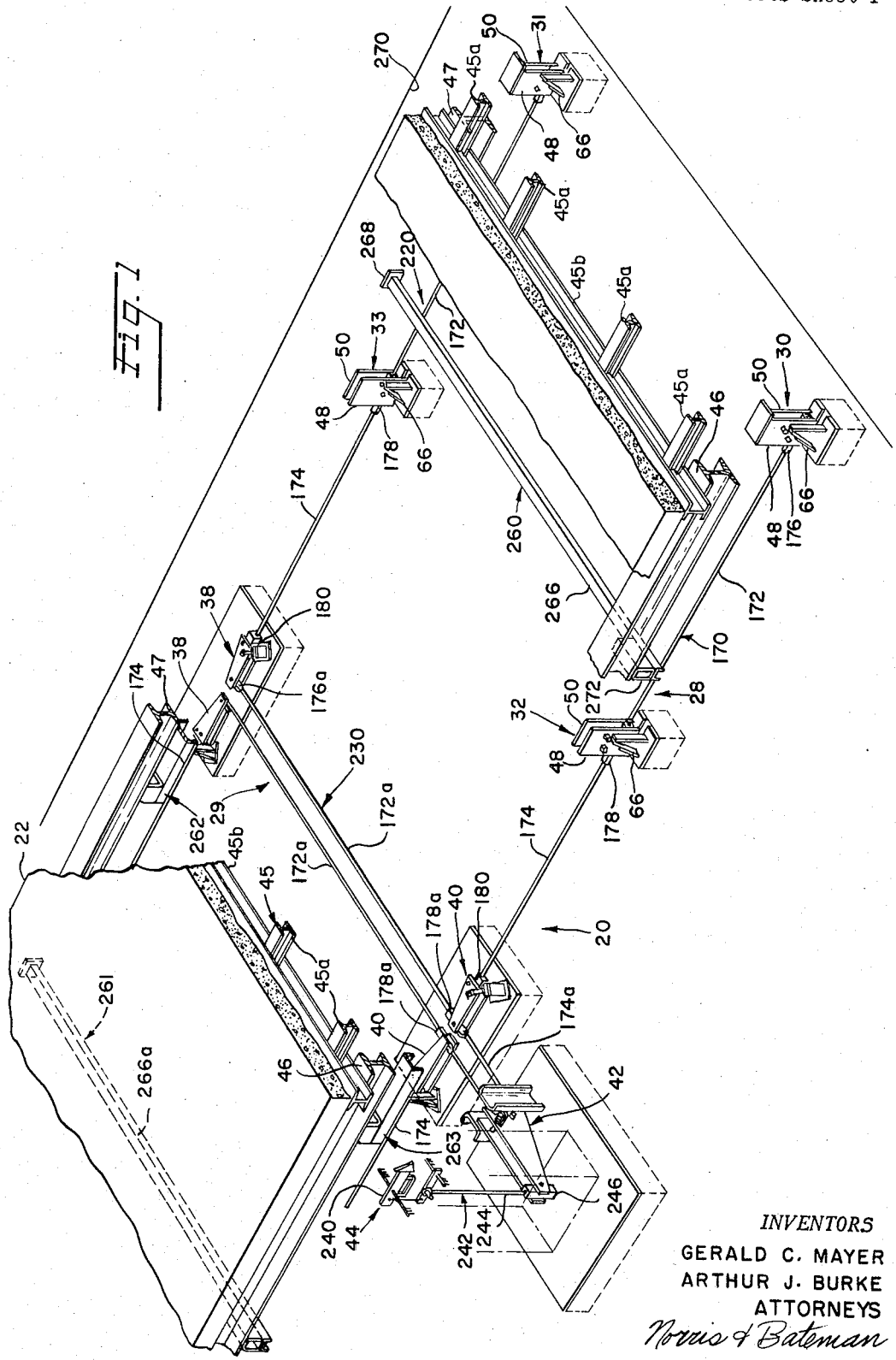
FIGURE 1 is a fragmentary, partially schematic, perspective view of a platform scale incorporating the lever system of this invention.
Figure 1B:
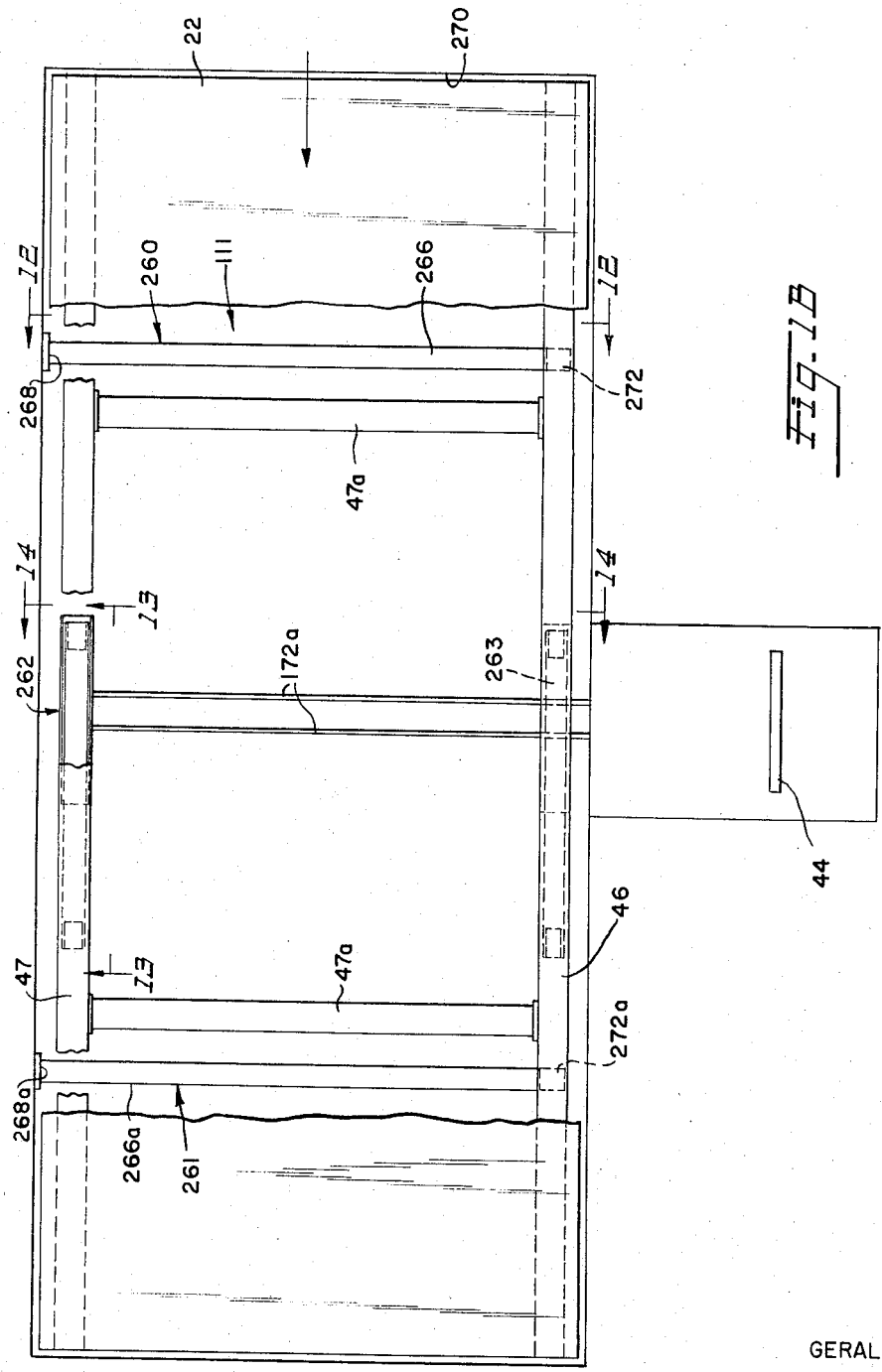
FIGURE 1b is a plan view of the scale shown in FIGURE 1 with portions of the scale platform broken away to illustrate the check rod assembly of this invention.

FIGURES 12, 13, and 14 are sections respectively taken substantially along lines 12—12, 13—13, and 14—14 of FIGURE 1b and illustrating the check rod assembly of this invention.

Referring now to the drawings and more particularly to FIGURE 1, the reference numeral 20 generally designates a platform scale incorporating this invention and comprising a suitable platform 22 which is operatively connected to a pair of lever systems 28 and 29. Lever system 28, as best shown in FIGURE 1a, comprises two pairs of main levers 30, 31, 32 and 33 and a pair of direction converting or turning levers 38 and 40.

As will be described in greater detail shortly, platform 22 is mounted on levers 30–33. Levers 30 and 32 are serially connected to lever 40 and levers 31 and 33 are serially connected to lever 38. Lever 38 is connected to lever 40 which, in turn, is separately connected to a force accumulating lever 42. Lever 42 is operatively connected to a weight indicating assembly 44 (FIGURE 1).

Levers 30–33, 38, 40 and 42, are of knee-joint construction.

Platform 22, as shown in FIGURES 1 and 12, is provided with a suitable, rigid framework 45 which is formed from longitudinally and transversely extending structural members respectively indicated by the reference characters 45a and 45b. Framework 45 is fixedly mounted on a pair of rigid, parallel, spaced apart, longitudinally extending I-beams 46 and 47 which are rigidly joined together by a plurality of transverse, parallel, structural, stiffening cross pieces 47a.

As best shown in FIGURES 2 and 3, lever 30 comprises a pair of flat-sided plates 48 and 50, a fulcrum knife edge pivot 52, a load-bearing knife edge pivot 54, and a power take-off knife edge pivot 56. Knife edge pivots 52, 54 and 56, which are mutually parallel, each have essentially square cross sections and are formed from suitable hardened steel with oppositely facing, parallel pairs of side surfaces. The opposite ends of each of the pivots 52, 54 and 56 extend with press fits through aligning, interfitting, stamped apertures formed in plates 48 and 50 respectively. Plates 48 and 50 and pivots 52, 54 and 56 are all fixed together as a unit, with plates 48 and 50 extending in parallel spaced apart relation to cooperatively form the load and power arms of the lever.

As shown, the axis of pivot 54 is laterally offset from and slightly below the axis of pivot 52, and the axis of pivot 54 is generally vertically above the axis of pivot 56. Pivots 52 and 56 are respectively mounted near the upper and lower edges of plates 48 and 50. All of the pivots 52, 54, and 56 span the space between plates 48 and 50.

Still referring to FIGURES 2 and 3, the opposite ends of pivot 52 extend appreciably beyond the oppositely facing sides of plates 48 and 50 and are seated on bearing blocks 58 and 60. Blocks 58 and 60 are formed with upwardly opening V-shaped notches which receive the downwardly facing, sharp, straight knife edge 62 formed on pivot 52.

Bearing block 58 is supported in a frame and bracket assembly 66 comprising a pair of upstanding, flat-sided plates 68 and 70 which are rigidly fixed together by a cross plate 72. Plate 68 is vertical, and plate 70 is slightly inclined toward the upper end of plate 68. Both of the plates 68 and 70 extend in planes which are parallel to the lever fulcrum axis at 62. Plate 72 extends in a plane normally intersecting the lever fulcrum axis about midway between the opposite side edges of plates 68 and 70.

The upper end of plate 72 is notched to form a socket 74 for receiving a bearing support bracket 76 which forms a part of assembly 66. Socket 74 has straight, parallel side walls respectively defined by plates 70 and 72. The bottom of socket 74, which is defined by the upper, notched edge of plate 72, is straight and extends at right angles to the socket side walls.

Bracket 76 comprises a pair of straight, parallel arms 78 and 80 which are joined at their lower ends by an integral bridge 82. The oppositely facing side surfaces of arms 78 and 80 extend at right angles to the bottom face of bridge 82 to provide bracket 76 with an essentially rectangular body section which interfittingly seats in socket 74.

Bracket 76 is formed with aligned bores 84 extending through arms 78 and 80. Between bores 84 bridge 82 is provided with an upwardly opening arcuate groove 88 (see FIGURE 3a). A bearing block pivot pin 90 is fixed at opposite ends in bores 84 and is seated in groove 88 between arms 78 and 80.

Bearing block 58, as best shown in FIGURE 3a, has a downwardly facing, open-ended groove 92. Groove 92 is formed with a smooth arcuate surface which interfittingly seats on the periphery of pin 90 between arms 78 and 80. The axis of pin 90 is at right angles to the lever fulcrum axis at 62.

Bearing block 58 is received with a guiding and sliding fit between arms 78 and 80 and is seated on pin 90 for limited rocking movement about the pin axis. A clearance space is provided between bearing block 58 and the bottom of the bracket socket to allow block 58 to freely rock through a limited distance. This rocking movement, it will be appreciated, extends in a plane that is parallel to the fulcrum axis of pivot 52. By allowing block 58 to rock in this manner, the bearing block V-shaped groove is self-aligning with knife edge 62.

Bearing block 60, as shown in FIGURE 2, is supported by a frame and bracket assembly 94 which is of the same construction as assembly 66. Accordingly, like reference numerals have been used to identify like parts. The rigid frames of assemblies 66 and 94 are mounted on suitable pads 96 and 97 and are symmetrically disposed on opposite sides of the lever. Pivotal movement of lever 30 about its fulcrum axis is limited in opposite directions by abutment of pivot 56 with plates 68 and 70 of assemblies 66 and 94.

As will be described in greater detail later on, the straight force transmitting knife edges of pivots 54 and 56 face in mutually perpendicular directions so that planes containing these knife edges normally intersect each other. This type of lever is referred to herein as a knee-action lever.

Levers 31–33, as shown in FIGURE 1a, are substantially identical to lever 30 and are each similarly supported by frame and bearing block assemblies which are the same as assemblies 66 and 94. Accordingly, like reference characters have been applied to identify like parts.

As shown in FIGURE 1, the fulcrum, load, and power pivot axes for levers 30–33 are all parallel, with the fulcrum axes being contained in a substantially common plane. When levers 30–33 are in parallel positions, the load and power axes will also be contained in common planes. The fulcrum axes of levers 30 and 32 respectively align with that of levers 31 and 33.

The assembly of platform 22, framework 45, and I-beams 46 and 47 is supported on levers 30–33 by identically constructed suspension assemblies 100. Each suspension assembly 100, as shown in FIGURES 2 and 3, is provided with a support stand 106 which comprises a downwardly opening structural channel member and which is fixedly mounted on a bearing block support bracket 110. The assembly of platform 22, framework 45, and I-beams 46 and 47, as will be described in detail later on, is slidably seated on each stand 106 and is restrained against longitudinal and lateral movement by a check rod type assembly 111 (FIGURE 1b).

Bracket 110, as shown in FIGURES 3 and 4, is provided with parallel, spaced apart arms 112 and 114 extending downwardly between the lever plates 48 and 50. Arms 112 and 114 provide a downwardly opening socket which receives a bearing block 118 of rectangular configuration.

Bearing block 118 is similar to blocks 58 and has an upwardly opening arcuate groove 120 through which a cylindrical pivot pin 122 coaxially extends. Pin 122 extends through aligned bores in arms 112 and 114. The longitudinal axis of pin 122 is contained in a plane extending medially between plates 48 and 50 and at right angles to pivots 52, 54, and 56.

Bearing block 118 is seated against the peripheral portion of pin 122 disposed between arms 112 and 114. Block 118 has a downwardly opening V-shaped notch 124 (FIGURE 4) which receives a sharp, straight line knife edge 126 on load pivot 54.

The weight of the platform structure seats pin 122 against the wall surface of groove 120 to thus firmly seat block 118 on pivot 54. As a result, platform 22 rests on pivot 54, the load being transmitted through support stand 106, bracket 110, pin 122 and bearing block 118. Block 118, being confined between pin 122 and pivot 54, is not secured to any part of the platform structure and is free to rock a limited distance about the axis of pin 122 to align itself with knife edge 126 under the influence of the platform load. The load applied through bearing block 118 extends medially between the support regions provided by bearing blocks 58 and 60 on opposite sides of the lever. Conically tipped elements 139 (see FIGURE 2) center block 118 between plates 48 and 50.

As shown in FIGURES 5–7, lever 40 is similar to levers 30–33 and comprises fulcrum, load, and power knife edge pivots 140, 141, and 142 and a pair of flat-sided plates 143, and 144. Pivots 140–142 each have substantially square cross sections and are essentially identical to pivots 52, 54, and 56 respectively.

Pivots 140–142 each extend at opposite ends through aligned, interfitting, stamped apertures which are formed in plates 143 and 144. Plates 143 and 144 are fixedly press-fitted onto pivots 140–142 in spaced, parallel relation and cooperatively provide the power and load arms of the lever. Pivots 140–142 bridge the space between plates 143 and 144 and extend along parallel axes which normally intersect the planes of the plates. The straight, force transmitting knife edges of pivots 141 and 142 face in mutually perpendicular directions so that planes containing these knife edges normally intersect each other.

As shown, pivot 141 is laterally offset from a straight line passing through the axes of pivots 140 and 142 so that the load and power arms of the lever transversely intersect at the axis of pivot 140. The opposite ends of pivot 140 extend appreciably beyond the oppositely facing side faces of plates 143 and 144 and has a sharp, straight knife edge 146. Knife edge 146 is seated in V-shaped notches which are formed in identically constructed bearing blocks 147 and 148.

Bearing block 147 is mounted between parallel arms 150 and 152 of a U-shaped bracket 154. Arms 150 and 152 are integrally joined together by a cross piece 156. The construction of bearing block 147 is essentially the same as block 58 and is similarly seated against a pin 158 for limited rocking movement about the pin axis. Pin 158 extends in aligned bores formed through arms 150 and 152 along an axis that is at right angles to the knife edge of pivot 140. Block 147 is thus confined between pivot 140 and pin 158. The rearward side of block 147 facing away from the V-shaped notch is spaced by pin 158 a sufficient distance from cross piece 156 to allow the bearing block to rock to an aligning position with knife edge 146. A rigid hook-shaped member 160 fixed to arm 152 extends partially around pivot 140 to limit movement of lever 40 in a direction that would completely unseat pivot 140 from bearing block 147.

As best shown in FIGURE 6, bearing block 148 is rockably supported by a bracket and pin assembly 162 which is of the same construction as the assembly of bracket 154, pin 158 and member 160. Accordingly, like reference numerals have been applied to identify like parts.

As shown, both of the brackets 154 for bearing blocks 147 and 148 extend beyond lever 40 and are fixed at corresponding ends to a rigid, upstanding post 166. Post 166 is mounted on a suitable, floor mounted pad 168.

The construction of lever 38 is the same as that just described for lever 40, with like reference characters being applied to designate like parts. The fulcrum, power, and load pivot axes of levers 38 and 40 are parallel and extend at right angles to the fulcrum, load, and power pivot axes of levers 30–33.

As shown in FIGURES 1 and 1a, an inextensible force transmitting assembly 170 serially interconnecting power pivots 56 of levers 30 and 32 and load pivot 141 of lever 40 comprises a pair of straight rods 172 and 174, and a series of bearing block and support units 176, 178, and 180.

Unit 176, as best shown in FIGURE 4, extends between plates 48 and 50 of lever 30 and comprises a pair of support plates 182 and 184 which are rigidly secured in spaced, parallel relation by a pair of pins 185 and 186. A bracket 187 having a pair of parallel arms 188 and 189 is formed with a bore through which pin 185 coaxially extends.

Bracket 187 is secured between plates 182 and 184 and receives a bearing block 190 between arms 188 and 189. Block 190 is seated for limited rocking movement against a pin 191 which is secured at opposite ends in aligned bores that are formed in arms 188 and 189 Similar to pin 90, pin 191 extends through opposed arcuate grooves formed in block 190 and bracket 187.

The forward end of block 190 extending beyond arms 188 and 189 is provided with a V-shaped notch 192 in which the straight, sharpened knife edge 193 of pivot 56 is seated. Block 190 is confined between pivot 56 and pin 191 in a manner similar to that described in connection with block 58. Block 190 being rockable about the axis of pin 191 is self-aligning with knife edge 193. Conically tipped set screws 194 (see FIGURE 2) threaded into plates 48 and 54 engage oppositely facing, planar sides of block 190 to center block 190 between plates 48 and 50.

Knife edge 193 extends between plates 48 and 50 and faces in a direction which is spaced 90 degrees from the direction in which knife edge 126 faces. Edges 193 and 126 therefore lie in force direction planes that interact at right angles.

As shown, pivot 56 is located between bearing block 190 and pin 186. Pins 185 and 186 are parallel and are essentially at right angles to the axis of pivot 56.

As shown in FIGURES 4 and 8, a fitting 198 is confined between plates 182 and 184 and is formed with a trunnion section 200 through which pin 186 rotatably extends. Fitting 198 is swingable about the axis of pin 186 and has a blind tapped bore 202 in which the threaded end of rod 172 is engaged.

Unit 178, as shown in FIGURE 11, essentially is of the same construction as unit 176, with like reference characters being applied. To connect rod 172 to unit 178 an extension 203 is provided and comprises a pair of support plates 204 and 205 having aligned apertures through which the pin 185 of unit 178 extends. Plates 204 and 205 are held between the bearing mounting bracket and the support plates of unit 178 in the manner shown.

Still referring to FIGURE 11, plates 204 and 206 extend beyond unit 178 and mount a pin 206 along an axis extending parallel to that of pins 185 and 186. A fitting 207 of the same construction as fitting 198 has a trunnion section 208 mounted on pin 206. The end of rod 172 opposite from unit 176 is threaded into fitting 207 as shown.

Referring back to FIGURES 5 and 7, unit 180 is essentially identical to unit 176, with like reference numerals applied. Fittings 198 of units 178 and 180 are respectively threaded onto opposite ends of rod 174. Rod 174 essentially axially aligns with rod 172 when levers 30 and 32 are rocked to parallel positions.

From the lever system thus far described, it will be appreciated that the platform force applied to lever 30, pivots lever 30 in a counterclockwise direction (as viewed from FIGURE 3) to pull on rod 172. The platform force and the force transmitted through rod 172 accumulatively rocks lever 32 in the same direction to pull on rod 174 and thereby rock lever 40 in a clockwise direction as viewed from FIGURE 5. Thus, when a load is applied to platform section 24, rods 172 and 174 are placed in tension.

As shown in FIGURES 1 and 1a, an inextensible force transmitting assembly 220 serially connects the power pivots 56 of levers 31 and 33 to the load pivot 141 of lever 38 in the same fashion just described in connection with assembly 170. Since assembly 220 is substantially identical to assembly 170, like reference characters being applied to designate like parts. The rods 172 and 174 of assemblies 170 and 220 are parallel as shown. When a load is applied to platform 22 to rock levers 30–33, levers 38 and 40 will be rocked in corresponding directions.

Still referring to FIGURES 1 and 1a, levers 38 and 40 are operatively connected to lever 42 by another inextensible force transmitting assembly 230. Lever 42, as shown in FIGURES 9 and 10, is essentially identical to levers 38 and 40. Accordingly, like reference characters suffixed by the letter "a" have been applied to identify the parts of lever 42. The bearing block and bracket assembly for pivotally supporting lever 42 is also the same as that described for lever 40. Like reference numerals suffixed by the letter a thus have been used to designate similar parts.

As best shown in FIGURE 9, brackets 154a are respectively fixed to upstanding structural members 232 and 234 which are mounted on a suitable pad 236. The axis of pivots 140a, 141a, and 142a are mutually parallel. The axis of fulcrum pivot 140a extends at right angles the fulcrum axes of levers 38 and 40 as well as levers 30–33.

As shown in FIGURES 1 and 1a, assembly 230 is substantially identical to assembly 170. Like reference numerals suffixed by the letter a have therefore been applied to designate the parts of assembly 230. Units 176a and 178a are pivotally connected to the power pivots 142 of levers 38 and 40 respectively. Unit 180a is pivotally connected to the load pivot 141a of lever 42.

As shown in FIGURE 1, the power pivot 142a of lever 42 is pivotally connected to a weigh beam assembly 240 by an inextensible force transmitting assembly 242. Beam assembly 240 forms a part of weight indicating device 44 as shown.

Assembly 242 comprises a vertical rod 244 which is pivotally connected to pivot 142a by a bearing block and bracket unit 246 (see FIGURES 1, 9, and 10). Unit 246 may be of the same construction as unit 176, like reference numerals being used to designate like parts.

As shown, rod 244 is threaded into fitting 198 of unit 246. The upper end of rod 244 is operatively connected to the weigh beam in the usual manner.

From the foregoing description it is clear that the forces applied to rock levers 30 and 32 and the forces applied to rock levers 31 and 33 are transmitted in parallel through assemblies 170 and 220 to rock levers 40 and 38 respectively. In this embodiment levers 38 and 40 provide a 90 degree change in direction. Assembly 230 thus extends in a common plane with and at right angles to assemblies 170 and 220. It will be appreciated, however, that levers 38 and 40 may be so disposed as to provide for any selected change in direction in the common plane containing assemblies 170, 220, and 230.

The force applied to pivot lever 38 is applied to the power pivot of lever 40 through rod 172a, tending to rock lever 40 in a corresponding direction. Rod 172a is thus in tension when a load is applied to platform 22.

The summation of the forces applied to lever 40 through rod 172a and assembly 170 is applied through rod 174a to pivot lever 42 about its fulcrum axis. This force is applied to weight beam assembly 240 to provide an indication of the load on platform 22. Owing to the lever arrangement of this invention, rod 174a is also in tension along with rod 172a.

As shown in FIGURE 1, lever system 29 is of the same construction as lever system 28. System 29 is arranged in identical mirror image relation with respect to system 28. Accordingly, like reference characters have been used to identify like parts.

Assemblies 230 of systems 28 and 29 are closely parallel and are separately connected to the load pivot of lever 42. Pivotal displacement of lever 42 thus represents the summation of the loads applied to platform 22.

As shown in FIGURE 1, assemblies 230 extend beyond platform 22 to conveniently located lever 42 and weigh beam assembly 240 to one side of the platform.

From the foregoing description it will be appreciated that the lever system of this invention is relatively simple in construction, lightweight, and easy to assemble and install at a weighing site. In addition, to increase the capacity of the scale, it is only necessary to increase the number of main levers. Such a change is relatively easy to accomplish with the lever arrangement of this invention.

Furthermore, a change in the size of the platform can be accomplished without altering the multiple of the levers, since it is only necessary to change the lengths of the motion transmitting rods 172, 174, and 172a with the lever construction and arrangement of this invention.

Referring to FIGURES 1 and 1b, levers 30 and 32 of each of the lever systems 28 and 29 are mounted vertically below I-beam 46, and levers 31 and 33 of each lever system are mounted vertically below I-beam 47. Flat-sided mounting plates 254, as best shown in FIGURES 2 and 3, are fixed to the bottom flanges of I-beams 46 and 47 for supporting I-beams 46 and 47 on the suspension assembly stands 106.

In accordance with this invention anti-friction Teflon sheets 256 and 258 (see FIGURES 2 and 3) are respectively epoxed or otherwise adhered to the underside of each plate 254 and to the top, flat face of each stand 106. It will be appreciated that other suitable anti-friction materials may be used in place of Teflon.

Each Teflon sheet 256 slidably seats on its associated sheet 258 to allow lateral and longitudinal displacement of the assembly of platform 22, framework 45 and I-beams 46 and 47. In effect, therefore, platform 22 is slidably seated on stands 106 for universal movement in a horizontal plane. This displacement of the platform and under structure is restrained by assembly 111 which will now be described.

Referring to FIGURES 1 and 1b, assembly 111 comprises a pair of transverse platform stabilizing units 260 and 261 and a pair of longitudinal platform stabilizing units 262 and 263. Unit 260 comprises an elongated structural flexure member 266 which is cantilever supported by a bracket and plate structure 268 from one side wall of the scale pit 270. Pit 270 is conventionally made from suitable concrete forms and is rectangular in shape to receive lever systems 28 and 29 and platform 22. The bracket and plate structure 268 is mounted on the pit side wall adjacent to I-beam 47.

As shown in FIGURES 1, 1b and 12, flexure member 266 extends horizontally below I-beams 46 and 47 at right angles to rods 172 and 174. Preferably, flexure member 266 is spaced forwardly of levers 30 and 31 and rearwardly of levers 32 and 33.

As best shown in FIGURE 12, a rectangular structural element 272 is mounted on the free end of flexure member 266 and is fixed as by bolt and nut assemblies 274 to the bottom flange of I-beam 46. Flexure member 266 is thus secured to platform 22 only through the connection provided by element 272.

Stabilizing unit 261, as best shown in FIGURE 1b is of the same construction as unit 260, like reference numerals suffixed by the letter a being applied to designate like parts. Flexure member 266a is mounted in cantilever fashion on the pit side wall from which member 268 is supported and extends at right angles to rods 172 and 174 of system 29 in a common horizontal plane with member 266. Structural element 272a secures the free end of member 266a to the bottom flange of I-beam 46 in the same manner as described for unit 260. Members 266 and 266a are parallel as shown. Preferably, units 260 and 261 are spaced equidistantly on opposite sides of a vertical, medial plane passing between lever systems 28 and 29.

The longitudinal thrust imparted to platform 22 by movement of a vehicle onto or across the platform from either end thereof, tends to flex members 266 and 266a along their longitudinal axes. As a result, platform 22 is biased to a normal, stabilized position. Laterally directed loads applied to platform 22 place members 266 and 266a either in tension or compression, depending upon the direction in which the force is exerted, to oppose lateral movement of the platform.

As best shown in FIGURES 13 and 14, unit 262 also comprises an elongated, structural flexure member 278 comprising a downwardly opening channel which is fixed in cantilever fashion on a rectangular structural part 280. Part 280 is fixed as by nut and bolt assemblies 282 to a channel 284. Channel 284 is suitably fixed on the upper ends of posts 166 for levers 38 of systems 28 and 29.

With continuing reference to FIGURES 13 and 14, flexure member 278 is spaced substantially vertically below I-beam 47 and above channel 284 and extends horizontally in substantially parallel relation to I-beam 47. Member 278 is fixed to part 280 at a region that is located above lever 38 in system 28.

The free end of flexure member 278 is located between levers 33 and 38 of system 29 and mounts a rectangular structural part 286. Part 286 is fixed as by nut and bolt assemblies 288 (see FIGURE 14) to the bottom flange of I-beam 47. With this construction it is clear that flexure member 278 is fixed to platform 22 only by the connection provided by part 286.

Unit 263 is of the same construction as unit 262, like reference numerals suffixed by the letter a being applied to designate the parts of unit 263. The cantilever support structure for unit 263 is also the same as that just described for unit 262. Accordingly, like reference numerals suffixed by the letter a also have been used to designate the elements of the support structure for unit 263.

As best shown in FIGURE 14, channel 284a is mounted on the upper ends of posts 166 for the two levers 40 of systems 28 and 29. Part 280a mounts flexure member 278a in cantilever fashion on channel 284a, in parallel relation with member 278, and vertically below I-beam 46. It is to be noted that the corresponding ends of flexure members 278 and 278a are fixed to I-beams 47 and 46 respectively. Thus, advancement of a vehicle over platform 22 in the direction of the arrow shown in FIGURE 1b places flexure members 278 and 278a in tension as platform 22 tends to longitudinally shift from right to left in FIGURE 1b under the vehicle imparted thrust. Although this direction of vehicle movement is preferred with the above described arrangement of flexure members, it will be appreciated that a vehicle could be advanced from left to right to place flexure members 278 and 278a in compression. In tension or compression, members 278 and 278a resist longitudinal displacement of platform 22. Lateral forces applied to platform 22 place members 266 and 266a in tension or compression, as previously described, to resist lateral displacement of the platform.

With the construction of assembly 111 described above, the deflection of members 266, 266a, 278 and 278a is relatively small but sufficient to absorb longitudinal and lateral impacts and thrusts to prevent these forces from being objectionably applied to lever systems 28 and 29. Members 266, 266a, 278, and 278a thus cooperate to effectively isolate lever systems 28 and 29 from any force components applied in a plane extending parallel to platform 22.

As shown in FIGURES 12 and 13, members 266, 266a, 278, and 278a are each formed with a plurality of downwardly opening notches 301. Members 266, 266a, 278, and 278a readily flex or bend about notches 301 when vertical motion, as permitted by the platform support levers, is imparted to platform 22 by varying the weight applied thereto. For weighing motor trucks and the like the vertical motion of platform usually is very small and is typically on the order of 0.005 inch maximum. The provision of notches 301 combined with the lengths of flexure members 266, 266a, 278, and 278a minimizes resistance to the vertical displacement of platform 22. As a consequence, the sensitivity of the scale is not impaired, and relatively small forces will cause a vertical displacement of the platform. If, for example, the flexure member length is made to be about 8 feet and an end deflection of 0.005 inch is applied to the 8 foot length, then only 0.005/96 inches or about one part in 20,000 of any thrust load would influence the weighing by appearing in the vertical plane. As a consequence, it is clear that a weighing could be accomplished in the presence of these thrust loads.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a scale having a load receiving structure, a weight indicating device, and a lever system operatively connecting said load receiving structure to said weight indicating device, said lever system comprising at least two pairs of main levers, two pairs of direction conversion levers, and a force accumulating lever, each of said levers having parallel spaced apart fulcrum, load and power knife pivots, the force transmitting knife edges on said load and power pivots of each lever facing in mutually perpendicular directions, means engaging the fulcrum pivots for pivoting each of said levers about a stationary fulcrum axis, the main lever fulcrum axes being contained in a substantially common plane that extends at right angles to the force accumulating and direction conversion lever fulcrum axes, the fulcrum axes of said direction conversion levers being parallel and at right angles to the fulcrum axis of said force accumulating lever, means mounting said load receiving structure on the load pivots of said main levers, first substantially inextensible force transmitting assemblies respectively and independently connecting the main lever power pivots to separate ones of the direction conversion lever load pivots, a pair of second substantially inextensible force transmitting assemblies respectively and independently connecting the power pivots of two of said conversion levers separately to the power pivots of the other two of said conversion levers, a pair of third substantially inextensible force transmitting assemblies respectively and independently connecting the power pivots of said other two conversion levers separately to the load pivot of said force accumulating lever, means operatively connecting the power pivot of said force accumulating lever to said weight indicating device, said means mounting said load receiving structure on the load pivots of said main levers providing for universal displacement of said load receiving structure in a horizontal plane, said load receiving structure comprising a horizontally extending, vehicle platform, and means for checking the displacement of said platform in said horizontal plane under the horizontal thrusts applied to said platform by moving vehicles and comprising a plurality of cantilever mounted flexure members having their free ends fixed to said platform.

2. In a scale having a load receiving structure, a weight indicating device, and a lever system operatively connecting said load receiving structure to said weight indicating device, said lever system comprising a plurality of main levers, at least a pair of direction conversion levers, a force accumulating lever, each of said levers having parallel spaced apart fulcrum, load, and power knife-edge pivots formed with rectangular cross sections and straight, force transmitting knife edges, the force transmitting knife edges on the load and power pivots of each lever being disposed to face in essentially mutually perpendicular directions, means engaging the fulcrum pivots for pivoting each of said levers about a stationary fulcrum axis, the main lever fulcrum axes being parallel and at right angles to the force accumulating and direction conversion lever fulcrum axes, the fulcrum axes of said conversion levers being mutually parallel and perpendicular to the fulcrum axis of said force accumulating lever, means mounting said load receiving structure on the load pivots of said main levers, first substantially inextensive force transmitting assemblies connecting the main lever power pivots to said direction conversion lever load pivots, a second substantially inextensible force transmitting assembly operatively interconnecting the power pivots of said direction conversion levers, a third substantially inextensible force transmitting assembly operatively connecting the power pivot of one of said conversion levers to the load pivot of said force accumulating lever, and means operatively connecting the power pivot of said force accumulating lever to said weight indicating device, each of said levers further comprising a pair of parallel, spaced apart, substantially coextensive plates extending at right angles to their associated pivot axes, said fulcrum, load, and power pivots of each lever extending at opposite ends through aligning interfitting, apertures in their associated plates to bridge the space therebetween, said means for pivoting each of said levers comprising a pair of support frame and bearing block assemblies disposed on oppositely facing sides of said plates, each of said frame and bearing block assemblies comprising a rigid frame structure providing an upwardly opening socket, a bracket fixed in said socket and having parallel spaced apart arms, a cylindrical pivot pin mounted in said bracket and bridging the space between said arms along an axis extending at right angles to the lever fulcrum axis, and a bearing block having an upwardly opening V-shaped groove seatingly receiving the knife edge on the lever fulcrum pivot, said bearing block being received between said arms and being seated on said pin for limited rocking movement about the axis of said pin to align itself with said knife edge.

3. The scale defined in claim 2 wherein said bearing block is formed with a downwardly facing arcuate groove through which said pin coaxially extends, said pin being seated against the surface of said arcuate groove to space said bearing block above the bottom of said socket and thereby provide a clearance space for rocking said block about the axis of said pin.

4. The scale defined in claim 3 wherein each frame structure comprises a pair of spaced plate members extending in planes that are parallel to the main lever fulcrum axis and a cross plate extending between said plate members at right angles to the lever fulcrum axis, said cross plate being fixed to said plate members and cooperating with at least one of said plate members to define said socket.

5. The scale defined in claim 4 wherein coacting stop abutment surfaces are positioned on one of said plate members and one of the main lever power and load pivots for limiting swinging movement of the main lever in a direction resulting from application of a load at the main lever load pivot.

6. In a vehicle platform scale, a load receiving platform, a weight indicating device, a lever system operatively connecting said platform to said weight indicating device and means for checking horizontal movement of said platform under the thrust applied thereto by moving vehicles, said lever system comprising a plurality of platform support levers each having parallel spaced apart fulcrum, load, and power pivots formed with straight, force transmitting knife edges, with the force transmitting knife edges in the load and power pivots of each lever being disposed to face in substantially mutually perpendicular directions, means engaging the knife edges on the fulcrum pivots of said levers for pivoting each of said levers about a stationary fulcrum axis, said levers being disposed with their stationary fulcrum axes in a common plane that extends parallel to said platform, suspension means supported on the load pivot knife edges of said levers, means seating said platform on said suspension means for horizontally lateral and longitudinal displacement relative to said suspension means, and motion transmitting means operatively connecting the power pivots of said levers to said weight indicating device, said checking means comprising a plurality of flexure members mounted in cantilever fashion separately of said lever system for opposing the lateral and longitudinal displacement of said platform on said suspension means.

7. The vehicle platform scale defined in claim 6 comprising a plurality of first sheets of anti-friction material fixed to the underside of said platform and disposed vertically above said suspension means on said levers, and a plurality of second sheets of anti-friction material mounted on upwardly facing surfaces of said suspension means, said first sheets being slidably seated on said second sheets to vertically support said platform and allow universal movement of said platform in a horizontal plane.

8. The vehicle platform scale defined in claim 6 wherein one end of each of said flexure members is fixed against movement, with one of said flexure members extending transversely beneath said platform and with the other of said flexure members extending longitudinally beneath said platform at essentially right angles to said one flexure member.

9. The vehicle platform scale defined in claim 8 wherein said flexure members extend substantially horizontally, whereby horizontally and longitudinally directed thrusts applied to said platform tend to deflect said one flexure member and to place said other flexure member in tension or compression depending upon the direction of said thrust.

10. The vehicle platform scale defined in claim 7 wherein said first and second sheets are formed from Teflon and are exposed to the surfaces on said suspension means and said platform.

11. A vehicle platform scale comprising a load receiving platform, a weight indicating device, a lever system operatively connecting said platform to said weight indicating device, and means for checking horizontal movement of said platform relative to a stationary surface, said lever system comprising a plurality of platform levers each having parallel load, fulcrum, and power pivots, means engaging the fulcrum pivots of said levers for pivoting each lever about a stationary fulcrum axis, suspension means mounted on the load pivots of said levers, means slidably seating said platform on said suspension means to provide for the horizontal displacement of said platform relative to said stationary surface, and motion transmitting means operatively connecting the power pivots of said levers to said weight indicating device, said checking means comprising a plurality of cantilever mounted flexure members each having one end fixed relative to said stationary surface and a free end fixed to said platform, one of said flexure members extending longitudinally of said platform and another of said flexure members extending transversely of said platform essentially at right angles to said one flexure member, said flexure members cooperating with each other to oppose lateral and longitudinal displacement of said platform by horizontally directed thrusts applied to said platform.

12. A vehicle platform scale comprising a load receiving platform, a weight indicating device, force transmitting means operatively connected to said weight indicating device, means mounting said platform on said force transmitting means and supporting said platform for horizontal displacement at least in a direction extending longitudinally with respect to vehicle movement over said platform, and means for checking the horizontal displacement of said platform under the thrust applied by a moving vehicle and comprising at least one flexure member mounted in cantilever fashion separately of said force transmitting means and having its free end fixed to said platform to oppose the horizontal, longitudinally directed displacement thereof.

13. The vehicle platform scale defined in claim 12 wherein said means mounting said platform provides horizontal surface means on which said platform is slidably seated.

14. The vehicle platform scale defined in claim 13 wherein said platform is seated on said surface means for both lateral and longitudinal displacement in a horizontal plane, and wherein said checking means comprises a further flexure member mounted in cantilever fashion separately of said force transmitting means and having its free end fixed to said platform, said one flexure member and said further flexure member being mutually perpendicular with one member extending transversely of said platform and the other extending longitudinally of said platform, said flexure members cooperating with each other to oppose both lateral and longitudinal displacement of said platform.

References Cited

UNITED STATES PATENTS 1,472,037  10/1923  Bogg.

FOREIGN PATENTS 1,953  6/1869  Great Britain.
131,845  5/1929  Switzerland.

RICHARD B. WILKINSON, *Primary Examiner.*

G. H. MILLER, *Assistant Examiner.*